J. Dennis,
Nut Lock.
No. 106,138. Patented Aug. 9. 1870.
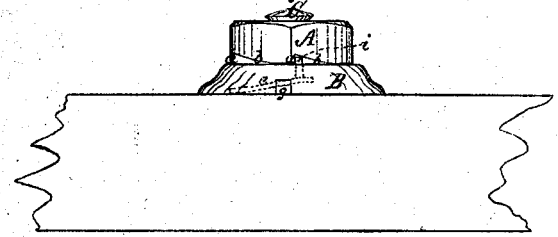
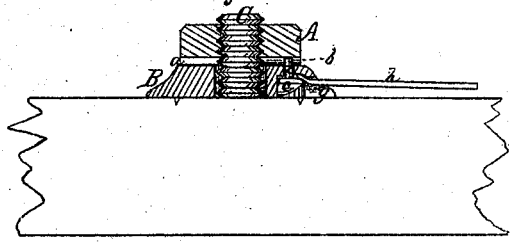
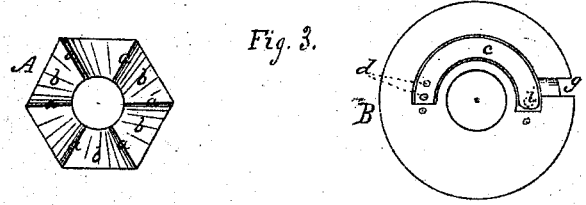
Witnesses:
Fred A. Walsh
Wm Hart
James Dennis
By D.F. Davis & Co.
Attys

United States Patent Office.

JAMES DENNIS, OF CHURCHVILLE, NEW YORK.

Letters Patent No. 106,138, dated August 9, 1870.

IMPROVEMENT IN NUT-LOCK.

The Schedule referred to in these Letters Patent and making part of the same

I, JAMES DENNIS, of Churchville, in the county of Monroe and State of New York, have invented a certain new and improved Nut-Fastening, of which the following is a specification.

My invention consists in the combination of the nut, having the inclinations and offsets formed on its back, with the metallic washer provided with the internal spring-bearing, the same being so constructed and combined in relation to each other that the nut, when screwed down, cannot become accidentally loosened or unscrewed, by reason of the engagement between the spring-bearing and the offsets of the nut, the said spring-bearing being also inclosed, so as to exclude dirt and protect it from injury.

Figure 1 is an elevation of my improved device.

Figure 2, a section of the same.

Figure 3, back views of the nut and the washer, detached.

Like letters of reference indicate corresponding parts in all the figures.

In the drawing—

A indicates the nut;

B, the washer; and

C, the bolt on which they are secured.

The nut A is made of the usual form, except that the back face is formed with notches or offsets, $a\ a$, and inclined planes or surfaces, $b\ b$, as shown.

The metallic washer B is provided with an annular slot or groove on its back face, in which rests a spring, $c$, that is secured therein by pivots, $d\ d$, at one end.

At its opposite or free end is provided a bearing or catch, $i$, which projects out through the washer and engages with the notched surface of the nut, so as to prevent the latter from accidentally unscrewing or working loose by any jarring action.

A slot or opening, $g$, is formed in the side of the washer, through which a pointed wire or prong, $h$, is inserted, as shown in fig. 2, to depress the spring bearing, when it is desired to loosen the nut.

As the nut A is screwed down against the washer B, each of the inclined surfaces $b\ b$, in passing over the bearing $i$ of the spring-catch $c$, gradually depresses the latter until it passes the offsets $a$, when it springs back again, as shown in fig. 1.

When the nut is in place, the bearing or catch $i$, resting against one of the offsets or shoulders, $a$, of the nut, thus prevents the latter from unscrewing, except when the spring is depressed, which is done by means of the point or prong $h$, as described.

The spring catch being self-acting, it is only necessary to screw the nut down against the washer, when it will be secured in place.

By inclosing the spring $c$ in the slot or groove of the washer, it is hidden from view, and also protected against injury and danger of being broken, while the washer itself has the appearance of one of the ordinary kind.

Another important feature is, that the spring $c$ is effectually protected against the collection of dust and dirt, which would seriously interfere with its free operation if it were exposed.

What I claim as my invention, is—

The spring $c$, inclosed in the washer B, the said spring being provided with the bearing $i$, and the washer having the lateral opening $g$, for the insertion of the arm $h$, in combination with the nut A, having the offsets and inclinations $a\ b$, the whole being arranged and operating substantially as herein set forth.

In testimony whereof I hereunto sign my name in the presence of two subscribing witnesses.

JAMES DENNIS.

Witnesses:
P. V. HAWLEY,
E. D. PIERSON.